United States Patent
Matsuda et al.

(10) Patent No.: US 9,096,117 B2
(45) Date of Patent: Aug. 4, 2015

(54) BODY STRUCTURE OF HYBRID VEHICLE

(71) Applicant: Fuji Jukogyo Kabushiki Kaisha, Tokyo (JP)

(72) Inventors: Hiroshi Matsuda, Tokyo (JP); Toshiaki Naruke, Tokyo (JP); Minoru Iida, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 13/685,203

(22) Filed: Nov. 26, 2012

(65) Prior Publication Data

US 2013/0133961 A1 May 30, 2013

(30) Foreign Application Priority Data

Nov. 29, 2011 (JP) ................................ 2011-260518

(51) Int. Cl.
- *B60K 1/04* (2006.01)
- *B60K 6/40* (2007.10)
- *B60K 6/48* (2007.10)

(52) U.S. Cl.
CPC ... *B60K 6/40* (2013.01); *B60K 1/04* (2013.01); *B60K 6/48* (2013.01); *B60K 2001/0422* (2013.01); *B60K 2001/0438* (2013.01); *B60K 2006/4808* (2013.01); *Y02T 10/626* (2013.01); *Y02T 10/6221* (2013.01); *Y10S 903/951* (2013.01)

(58) Field of Classification Search
USPC ........ 180/291, 292, 309, 68.5, 69.1; 903/907, 903/951
See application file for complete search history.

(56) References Cited

U.S. PATENT DOCUMENTS

| | | | | |
|---|---|---|---|---|
| 1,138,122 | A * | 5/1915 | Lambert et al. | 180/68.5 |
| 4,445,584 | A * | 5/1984 | Kimura et al. | 180/69.22 |
| 4,738,459 | A | 4/1988 | Nakamura et al. | |
| 5,501,289 | A * | 3/1996 | Nishikawa et al. | 180/68.5 |
| 5,562,178 | A * | 10/1996 | Worden et al. | 180/291 |
| 5,833,023 | A * | 11/1998 | Shimizu | 180/68.5 |
| 6,041,877 | A | 3/2000 | Yamada et al. | |
| 6,547,020 | B2 * | 4/2003 | Maus et al. | 180/68.5 |
| 8,182,393 | B2 | 5/2012 | Gillingham et al. | |
| 8,480,538 | B2 | 7/2013 | Gillingham et al. | |
| 8,714,289 | B2 | 5/2014 | Olsen et al. | |
| 2010/0163322 | A1 * | 7/2010 | Stefani et al. | 180/65.21 |
| 2010/0307848 | A1 * | 12/2010 | Hashimoto et al. | 180/68.5 |

(Continued)

FOREIGN PATENT DOCUMENTS

| | | |
|---|---|---|
| JP | 04-312304 | 11/1992 |
| JP | 05-208617 | 8/1993 |
| JP | 07-047842 | 2/1995 |

(Continued)

*Primary Examiner* — Frank Vanaman
(74) *Attorney, Agent, or Firm* — Smith, Gambrell & Russell, LLP

(57) ABSTRACT

A body structure of a hybrid vehicle. The hybrid vehicle is driven using power of an engine and electric power supplied from a battery module. The body structure includes a propeller shaft disposed in a lower side of a floor panel in a vertical direction of the vehicle so as to extend in a fore-aft direction of the vehicle and configured to transmit the power of the engine and the electric power to at least a rear wheel; and an integrated battery pack below the floor panel so as to cover the propeller shaft. The integrated battery pack has at least the battery module. The battery pack includes a recess to house the propeller shaft.

8 Claims, 3 Drawing Sheets

(56) References Cited

U.S. PATENT DOCUMENTS

2012/0312612 A1* 12/2012 Harrison et al. ............ 180/68.5
2013/0248264 A1    9/2013 Matsuda et al.

FOREIGN PATENT DOCUMENTS

| JP | 2000-247261 | 9/2000 |
| JP | 2010-155570 | 7/2010 |

* cited by examiner

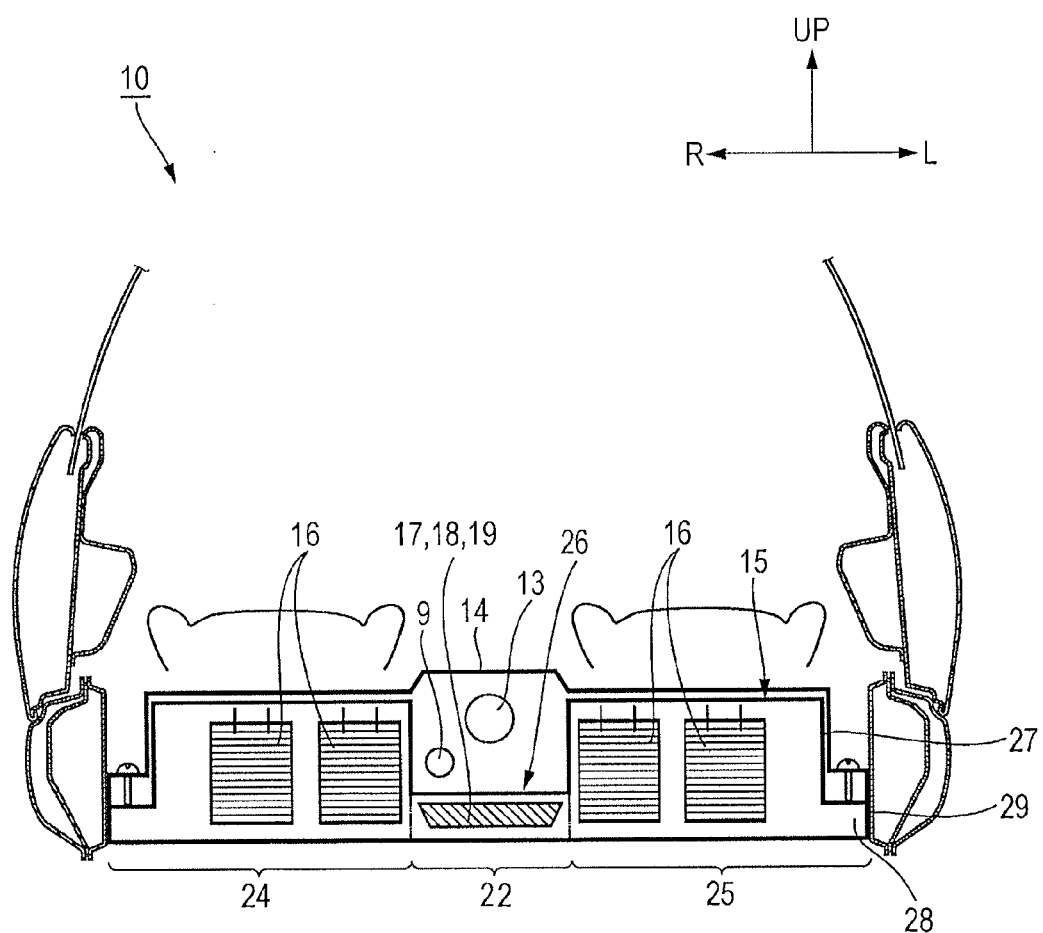

BODY STRUCTURE OF HYBRID VEHICLE

CROSS-REFERENCE TO RELATED APPLICATIONS

The present application claims priority from Japanese Patent Application No. 2011-260518 filed on Nov. 29, 2011, the entire contents of which are hereby incorporated by reference.

BACKGROUND OF THE INVENTION

1. Field of the Invention

The present invention relates to a body structure of a hybrid vehicle, and in particular, to a body structure of a hybrid vehicle that has a battery pack disposed outside the cabin of the vehicle.

2. Description of the Related Art

There is commonly known a body structure of a hybrid vehicle that has a battery pack disposed on the back side of the rear seats. The body structure of a hybrid vehicle needs a shielding member that prevents heat from being transmitted to the rear seats, the heat being radiated from the battery pack.

The necessity of a shielding member may increase the production cost of the body structure of a hybrid vehicle. In addition, the body structure of such a hybrid vehicle may cause the temperature in the vehicle cabin to be increased due to the heat radiated from the battery pack.

Thus, in recent years, there has been a demand for a body structure of a hybrid vehicle that has the battery pack disposed outside the vehicle cabin. For example, Japanese Unexamined Patent Application Publication (JP-A) No. 2000-247261 discloses a vehicle body floor structure that has a battery below the floor panel of the vehicle.

However, if a battery is disposed below the floor panel of a vehicle, and the vehicle is an FR drive system or 4WD system vehicle that needs a propeller shaft, the propeller shaft interferes with the center of the battery pack, and thus a plurality of battery packs needs to be disposed on both sides of the propeller shaft in the vehicle width direction.

Therefore, when the vehicle body floor structure in the above-mentioned JP-A No. 2000-247261 is applied to a vehicle that needs a propeller shaft, the temperature may vary in each battery pack.

In the above-mentioned JP-A No. 2000-247261, each battery pack needs a junction box, a battery control unit (BCU), a service plug, and the like. This increases the production cost. In the above-mentioned JP-A No. 2000-247261, each battery pack needs a junction box, a BCU, a service plug, and the like. Furthermore, additional manufacturing processes are needed for attaching the junction box, the BCU, the service plug, and the like to each battery pack.

SUMMARY OF THE INVENTION

In view of the above, it is an object of the present invention to provide a body structure of a hybrid vehicle that allows an integrated battery pack to be disposed on a vehicle which needs a propeller shaft.

A first aspect of the present invention provides a body structure of a hybrid vehicle driven using the power of an internal combustion engine and the power of a drive motor driven by electrical power supplied from a secondary battery. The body structure includes: a propeller shaft disposed in a lower side of a floor panel in a vertical direction of the vehicle so as to extend in a fore-aft direction of the vehicle, and configured to transmit the power of the internal combustion engine and the power of the drive motor to at least a rear wheel; and an integrated battery unit disposed below the floor panel so as to cover the propeller shaft, the integrated battery unit having at least the secondary battery. The battery unit includes a recess to house the propeller shaft. Thus, with the body structure of a hybrid vehicle according to the present invention, an integrated battery pack can be disposed on a vehicle that needs a propeller shaft.

Preferably, the recess of the body structure of a hybrid vehicle is provided with an insulating member on a surface of the recess, the surface facing the propeller shaft.

Preferably, the battery unit of the body structure of a hybrid vehicle has a smoothly formed lower surface in the vertical direction of the vehicle.

Preferably, the battery unit of the body structure of a hybrid vehicle has a contact surface in contact with a vehicle frame in the width direction of the vehicle.

Preferably, the outer periphery of the above-described battery unit of the body structure of a hybrid vehicle is provided with a mounting section to mount the battery unit on the floor panel.

Preferably, the recess of the body structure of a hybrid vehicle serves as a receiver to receive the propeller shaft.

Preferably, the battery unit of the body structure of a hybrid vehicle is connected to a covering member of the internal combustion engine.

A second aspect of the present invention provides a body structure of a hybrid vehicle driven using the power of an internal combustion engine and the power of a drive motor which is driven by electrical power supplied from a secondary battery. The body structure includes: a floor tunnel formed by raising a floor panel from below to above; and an integrated battery unit in a lower surface of the floor tunnel so as to cover the floor tunnel, the integrated battery unit having at least the secondary battery. The battery unit includes a recess on a side of the floor tunnel.

BRIEF DESCRIPTION OF THE DRAWINGS

FIG. 3 is a cross-sectional view taken along a line III-III in FIG. 1.

DESCRIPTION OF THE PREFERRED EMBODIMENTS

Figure 1:
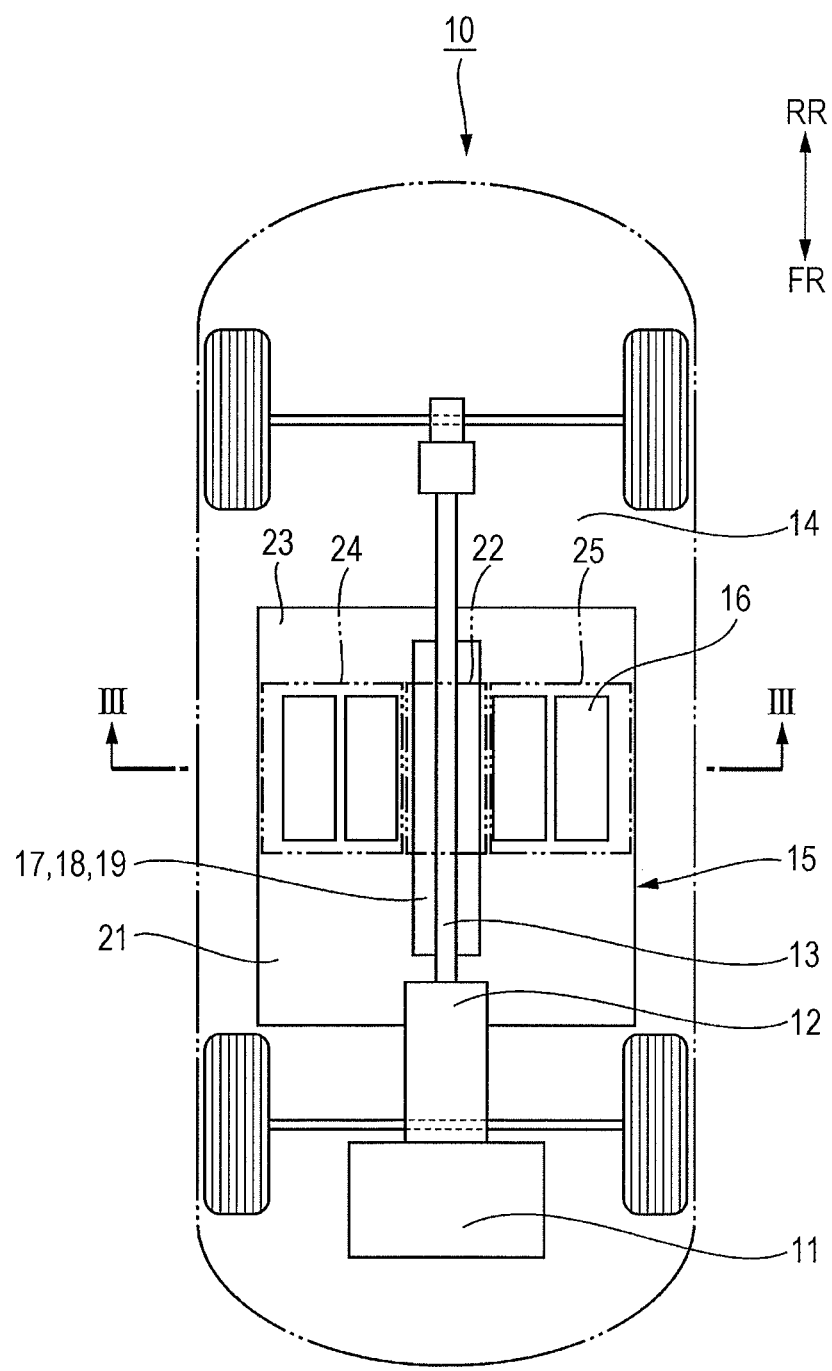
FIG. 1 is a plan view schematically illustrating a body structure of a hybrid vehicle according to an embodiment of the present invention.

Hereinafter, a body structure of a hybrid vehicle according to an embodiment of the present invention will be described with reference to FIGS. 1 to 3. FIG. 1 is a plan view schematically illustrating the body structure of a hybrid vehicle 10 according to the embodiment of the present invention.

Figure 2:
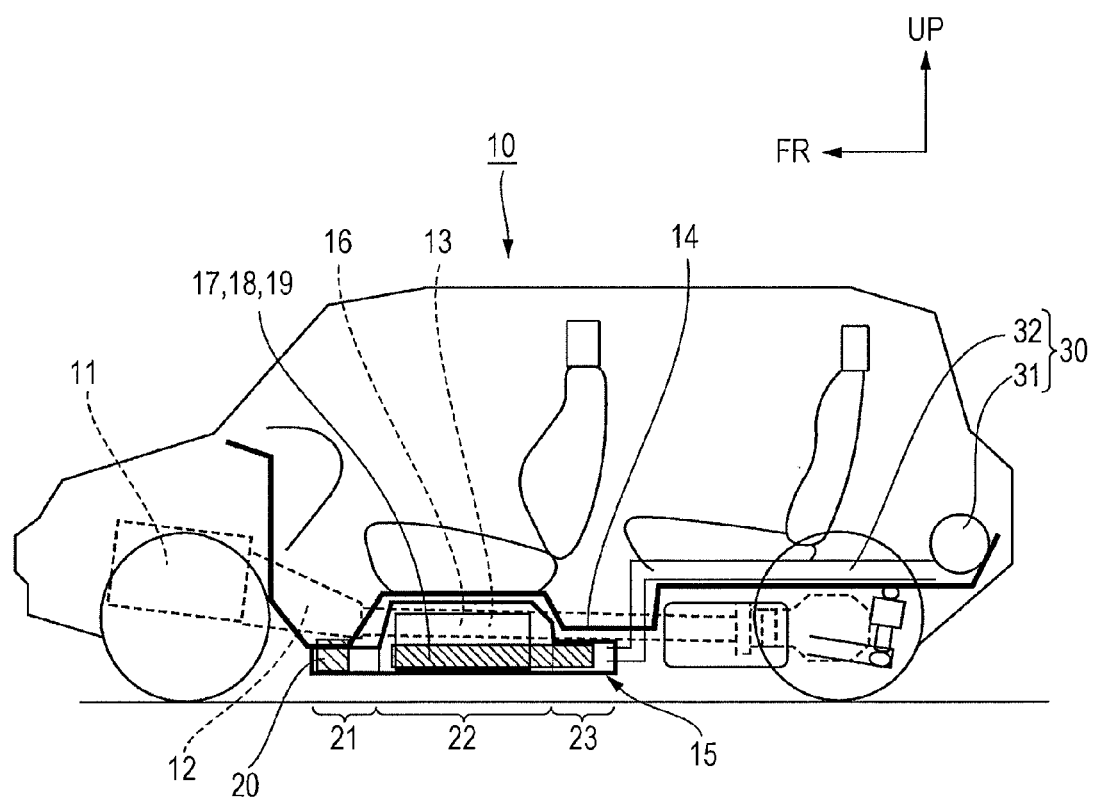
FIG. 2 is a side view schematically illustrating the body structure of a hybrid vehicle according to the embodiment of the present invention.

FIG. 2 is a side view schematically illustrating the body structure of the hybrid vehicle 10 according to the embodiment of the present invention, and FIG. 3 is a cross-sectional view taken along the line III-III in FIG. 1.

As illustrated in FIGS. 1 to 3, the hybrid vehicle 10 in the present embodiment includes an engine (internal combustion engine) 11 on the forward side in the travelling direction of the hybrid vehicle 10. The engine 11 is connected with an electromagnetic clutch, which is not illustrated. The electromagnetic clutch is connected with a transmission, which is not illustrated.

That is to say, the hybrid vehicle 10 transmits a driving force from the engine 11 to the transmission via the electromagnetic clutch. The transmission is formed using continuously variable transmission. The transmission is connected to the front differential gear, which is not illustrated.

The driving force in the present embodiment is supplied from the engine, however, the driving force may be supplied from a motor such as an electric driven motor without being limited to the engine. In addition, the driving force may be transmitted via any other transmission device such as a normal clutch and is not limited to the electromagnetic clutch. Furthermore, the transmission is not limited to the continuously variable transmission and may be any other transmission such as a manual transmission.

The front differential gear is connected to front-wheel drive shafts on the left and right, which are not illustrated. That is to say, the hybrid vehicle 10 transmits the driving force of the engine 11 to the front-wheel drive shafts on the left and right via the front differential gear. A transmission 12 is mounted on the rear end of the transmission in the fore-aft direction of the vehicle.

The transmission 12 is connected to a propeller shaft 13. The transmission 12 is formed with a gear, which is not illustrated. Because the gear of the transmission 12 is engaged with the ring gear of the front differential gear, part of the driving force is transmitted to the propeller shaft 13.

The propeller shaft 13 extends in the fore-aft direction of the vehicle below a floor panel 14 in the vertical direction of the vehicle. The rear side of the propeller shaft in the fore-aft direction of the vehicle is connected to a rear differential gear, which is not illustrated. The rear differential gear is connected to rear-wheel drive shafts on the left and right, which are not illustrated. That is to say, part of the driving force is transmitted from the propeller shaft 13 to the rear-wheel drive shafts on the left and right via the rear differential gear.

In addition to the propeller shaft 13, an exhaust pipe 9 for exhausting an exhaust gas emitted from the engine 11 is disposed below the floor panel 14 in the vertical direction of the vehicle. In this manner, at least the propeller shaft 13 and the exhaust pipe 9 are disposed below the floor panel 14 in the vertical direction of the vehicle as described above.

In the present embodiment, the body structure of the hybrid vehicle 10 includes a battery pack 15 in addition to the propeller shaft 13 and the exhaust pipe 9 below the floor panel 14 in the vertical direction of the vehicle.

The battery pack 15 combines battery modules 16, a BCU 17, distribution cables 18, a junction box 19, and a service plug 20, and serves as an assembly.

That is to say, the battery pack 15 in the present embodiment is integrally formed. As described above, the body structure of the hybrid vehicle 10 includes the propeller shaft 13 in the fore-aft direction of the vehicle below the floor panel 14.

Therefore, when the battery pack 15 is mounted below the floor panel 14 of a conventional hybrid vehicle with FR drive system or 4WD system, the body structure of the vehicle is divided on both sides of the propeller shaft in the width direction of the vehicle.

On the other hand, as described above, the body structure of the hybrid vehicle 10 in the present embodiment allows the integrated battery pack 15 to be mounted on the hybrid vehicle 10 which is a vehicle needing the propeller shaft 13, such as an FR drive system or 4WD system vehicle.

Specifically, the battery pack 15 is divided into front, middle and rear sections in the fore-aft direction of the vehicle, i.e., includes a front-side section 21, a middle part, and a rear-side section 23. The middle part of the battery pack 15 includes a middle section 22, and a right-side section 24 and a left-side section 25 on both sides of the middle section 22 in the width direction of the vehicle.

That is to say, the battery pack 15 includes five divided sections, i.e., the front-side section 21, the middle section 22, the rear-side section 23, the right-side section 24 and the left-side section 25. In the battery pack 15, each of the battery modules 16, the BCU 17, the distribution cables 18, the junction box 19, and the service plug 20 is disposed in one of the front-side section 21, the middle section 22, the rear-side section 23, the right-side section 24 and the left-side section 25, and thus the battery pack 15 serves as an assembly as described above.

Here, the battery modules 16, the BCU 17, the distribution cables 18, the junction box 19, and the service plug 20 which constitute the battery pack 15 in the present embodiment are known technology, and thus detailed description thereof is omitted and a simple description is given.

The battery modules 16 are respectively disposed in the right-side section 24 and the left-side section 25 of the battery pack 15. Each battery module 16 has a function of supplying electrical power to a drive motor as a driving source.

In the present embodiment, as described above, the battery pack 15 is formed such that two battery modules 16 are disposed on each of the left and right sides of the propeller shaft 13 in the width direction of the vehicle. However, for example, one large battery module 16 may be disposed on each of the left and right sides of the propeller shaft 13. Alternatively, three small battery modules 16 may be disposed on each of the left and right sides of the propeller shaft 13.

The BCU 17 is disposed in the middle section 22 of the battery pack 15. The BCU 17 has a function of controlling the battery module 16. That is to say, the BCU 17 measures the voltages, currents, temperatures, and the like of the battery modules 16 in order to recognize the state of each of the battery modules 16. In addition, the BCU 17 monitors the input of electrical power 16 to the drive motor from the battery modules.

Similarly to the BCU 17, the distribution cables 18 are disposed in the middle section 22 of the battery pack 15. The distribution cables 18 have a function of connecting the battery modules 16 to each other.

The distribution cables 18 are provided with the junction box 19. The junction box 19 has functions of connecting, branching, and relaying the distribution cables 18.

The service plug 20 is disposed in the front-side section 21 of the battery pack 15. The service plug 20 has a function of blocking a high voltage which is generated from the battery modules 16. Thus, the service plug 20 blocks a high voltage when the battery pack 15 is attached or detached, and thus provides safe working conditions.

In this manner, in the battery pack 15 in the present embodiment, each of the battery modules 16, the BCU 17, the distribution cables 18, the junction box 19, and the service plug 20 is disposed in one of the front-side section 21, the middle section 22, the rear-side section 23, the right-side section 24 and the left-side section 25, and thus the battery pack 15 is integrally formed.

Thus, with the body structure of the hybrid vehicle 10 in the present embodiment, the number of the BCU 17, the distribution cables 18, the junction box 19, and the service plug 20 can be decreased, and thus the production cost can be reduced.

The integrated battery pack 15 is disposed below the floor panel 14 so as to cover the propeller shaft 13. In addition, the battery pack 15 includes a recess 26 to house the propeller shaft 13. That is to say, the battery pack 15 is disposed below the floor panel 14 so as not to interfere with the propeller shaft 13 because of the recess 26.

Here, the battery pack 15 in the present embodiment is disposed at the lowest point in the vertical direction of the vehicle. That is to say, the battery pack 15 is not disposed at a section with projections and recesses, such as the back of the rear seats, and thus the lower surface of the battery pack 15 in the vertical direction of the vehicle can be formed in any shape.

Thus, the battery pack 15 has a smoothly formed bottom surface. For this reason, the body structure of the hybrid vehicle 10 in the present embodiment allows the battery modules 16, the BCU 17, the distribution cables 18, the junction box 19, and the service plug 20 which constitute the battery pack 15 to be easily disposed, in particular, wiring of the BCU 17, the distribution cables 18, and the junction box 19 can be easily done, and thus workability can be improved.

The recess 26 of the battery pack 15 in the present embodiment is provided with an insulating member on the surface of the recess 26, which faces the propeller shaft 13. The insulating member on the recess surface itself is, for example, a thermal insulation plate.

Consequently, the battery pack 15 in the present embodiment can prevent the heat generated from the battery pack 15 from being transferred into the recess 26. On the other hand, the battery pack 15 can prevent the heat generated from the exhaust pipe housed in the recess 26 from being transferred to the battery pack 15.

As described above, the battery pack 15 is disposed below the floor panel 14 so as to cover the propeller shaft 13, i.e., so as to cover the propeller shaft 13 from the lower side in the vertical direction of the vehicle, and thus the battery pack 15 serves as a receiver which receives the propeller shaft 13.

Consequently, the battery pack 15 in the present embodiment can prevent the propeller shaft 13 from coming off. If the propeller shaft 13 comes off, the tension of the propeller shaft 13 may cause the vehicle to be lifted, i.e., a so-called pole vault phenomenon may occur.

That is to say, the battery pack 15 in the present embodiment receives the propeller shaft 13 to prevent the occurrence of a pole vault phenomenon, thereby improving the safety of the vehicle.

In the present embodiment, the hybrid vehicle 10 is a vehicle which needs the propeller shaft 13, such as an FR drive system or 4WD system vehicle, however, a similar effect is obtained even for a vehicle without the propeller shaft 13, such as an FF drive system vehicle, or for a vehicle in which the exhaust pipe 9 and the like are disposed below the floor panel 14 of the vehicle.

The outer periphery of the battery pack 15 is provided with a flange (mounting section) 28 via which the battery pack 15 is mounted on the floor panel 14. The flange 28 is then provided with pins.

Thus, because the battery pack 15 is integrally formed as described above, the battery pack 15 can be mounted on the floor panel 14 by inserting the pins into the floor panel 14, and thus the mounting can be easily performed.

Furthermore, the battery pack 15 includes a first contact surface 27 and a second contact surface 29, the first contact surface 27 coming into contact with the floor panel 14, and the second contact surface 29 coming into contact with a side pillar when the battery pack 15 is mounted on the floor panel 14.

Accordingly, the battery pack 15, as well as the floor panel 14 and the side pillar, have a function of absorbing an impact which occurs when the vehicle experiences a side collision.

Consequently, the body structure of the hybrid vehicle 10 allows the battery pack 15 to serve as a stiffening member at the time of a side collision, and thus safety against a side collision can be improved.

The front side of the battery pack 15 in the present embodiment is connected to a cover member for the engine 11. In this manner, the body structure of the hybrid vehicle 10 in the present embodiment is formed with the integrated battery pack 15, and thus the number of connection points can be easily increased more than in a separated battery pack. Therefore, the battery pack 15 can be firmly connected.

Thus, the body structure of the hybrid vehicle 10 in the present embodiment allows the integrated battery pack 15 to be mounted below the floor panel 14 of the vehicle 10 which needs the propeller shaft 13, and thus workability at the time of attachment and detachment of the battery pack 15 can be improved.

In addition, with the body structure of the hybrid vehicle 10 in the present embodiment, the battery pack 15 is mounted below the floor panel 14 and the front row seat. Here, the lower part below the front row seat is at a position which is furthest from the wheels, and thus has a relatively larger space than in other parts of the vehicle.

Therefore, with the body structure of the hybrid vehicle 10 in the present embodiment, even when the battery pack 15 is disposed below the floor panel 14, the vehicle cabin space is prevented from being decreased, and thus the influence to the vehicle cabin space can be reduced.

In the present embodiment, the body structure of the hybrid vehicle 10 allows a cooling device 30 for supplying cool air into the battery pack 15 to be connected to the rear-side section 23 of the battery pack 15.

The cooling device 30 includes a cooling fan 31 for providing cool air, and a cooling duct 32 for blowing the cool air from the cooling fan 31 to the battery pack 15. The cooling fan 31 and the cooling duct 32 which constitute the cooling device 30 are known technology, and thus description thereof is omitted.

Here, the battery pack 15 in the present embodiment is integrally formed as described above. That is to say, the body structure of the hybrid vehicle 10 in the present embodiment allows the cool air from the cooling fan 31 to be blown into the battery pack 15 without dispersing, thus the cool air can be uniformly blown into the battery pack 15.

Consequently, the body structure of the hybrid vehicle 10 in the present embodiment can suppress the variation in the temperatures of the battery modules 16 within the battery pack 15.

Thus, the body structure of the hybrid vehicle 10 in the present embodiment allows the integrated battery pack 15 to be mounted on the hybrid vehicle 10 which needs the propeller shaft 13, and thus the variation in the temperature within the battery pack 15 can be suppressed.

What is claimed is:
1. A body structure of a hybrid vehicle driven using power of an internal combustion engine and electric power supplied from a secondary batteries, the body structure comprising:
a propeller shaft disposed in a lower side of a floor panel in a vertical direction of the vehicle so as to extend in a fore-aft direction of the vehicle, and configured to transmit the power of the internal combustion engine and the electric power to at least a rear wheel; and
an integrated battery unit disposed below the floor panel so as to cover the propeller shaft, the integrated battery unit having at least the first secondary battery and a second secondary battery, wherein the intergrated battery unit includes a middle section, a right-side section and a left-side section in the width direction of the vehicle, the battery unit includes a recess that is open toward the floor panel to house the propeller shaft, and which extends in the fore-aft direction of the vehicle between the first and second secondary batteries, and the propeller shaft is housed in an inner space enclosed by the floor panel and an upper surface of the battery unit, the upper surface of the battery unit also defining the lower surface of the recess.

2. The body structure of a hybrid vehicle according to claim 1, wherein the recess is provided with an insulating member on a surface of the recess, facing the propeller shaft.

3. The body structure of a hybrid vehicle according to claim 1, wherein the battery unit has a smoothly formed lower surface in the vertical direction of the vehicle.

4. The body structure of a hybrid vehicle according to claim 1, wherein the battery unit has a contact surface in contact with a vehicle frame in a width direction of the vehicle.

5. The body structure of a hybrid vehicle according to claim 1, wherein an outer periphery of the battery unit is provided with a mounting section to mount the battery unit on the floor panel.

6. The body structure of a hybrid vehicle according to claim 1, wherein the right-side and left-side sections of the integrated battery unit from lateral sections of the recess that at least partially cover lateral sides of the propeller shaft.

7. The body structure of a hybrid vehicle according to claim 1, wherein the integrated battery unit is joined to a vehicle body in the position below the lower surface of the floor panel such that the battery unit recess and the floor panel house the propeller shaft.

8. The body structure of a hybrid vehicle according to claim 7, wherein the lower surface of the floor panel comprises a floor tunnel formed by raising the lower surface of the floor panel from below to above, and the floor tunnel is a section of the floor panel that houses the propeller shaft.

* * * * *